United States Patent
Li et al.

(10) Patent No.: US 11,533,263 B2
(45) Date of Patent: Dec. 20, 2022

(54) SELF-DESCRIBING PACKET HEADERS FOR CONCURRENT PROCESSING

(71) Applicant: Huawei Technologies Co., Ltd., Shenzhen (CN)

(72) Inventors: Renwei Li, Sunnyvale, CA (US); Uma S. Chunduri, Fremont, CA (US); Alexander Clemm, Los Gatos, CA (US); Kiran Makhijani, Los Gatos, CA (US); Yingzhen Qu, San Jose, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 336 days.

(21) Appl. No.: 16/651,778

(22) PCT Filed: Sep. 28, 2018

(86) PCT No.: PCT/US2018/053500
§ 371 (c)(1),
(2) Date: Mar. 27, 2020

(87) PCT Pub. No.: WO2019/067945
PCT Pub. Date: Apr. 4, 2019

(65) Prior Publication Data
US 2020/0244582 A1    Jul. 30, 2020

Related U.S. Application Data

(63) Continuation of application No. 16/124,770, filed on Sep. 7, 2018, now Pat. No. 10,972,397.
(Continued)

(51) Int. Cl.
*H04L 47/24* (2022.01)
*H04L 45/00* (2022.01)
(Continued)

(52) U.S. Cl.
CPC .......... *H04L 47/2458* (2013.01); *H04L 45/02* (2013.01); *H04L 45/20* (2013.01);
(Continued)

(58) Field of Classification Search
None
See application file for complete search history.

(56) References Cited

U.S. PATENT DOCUMENTS 6,970,462 B1 *  11/2005  McRae  ............... H04L 63/0236
                                                370/392
2008/0291917 A1 *  11/2008  Cassod  ................... H04L 41/22
                                                370/392
(Continued)

FOREIGN PATENT DOCUMENTS

| CN | 102158409 A | 8/2011 |
|---|---|---|
| CN | 107079056 A | 8/2017 |

(Continued)

OTHER PUBLICATIONS

"Chinese Application No. 201880063550.4, Notification to Grant Patent Right for Invention dated Sep. 24, 2021", (dated Sep. 24, 2021), 6 pgs.
(Continued)

Primary Examiner — Anh Ngoc M Nguyen
(74) Attorney, Agent, or Firm — Schwegman Lundberg & Woessner, P.A.

(57) ABSTRACT

A Self-Describing Packet block (SDPB) is defined that allows concurrent processing of various fixed headers in a packet block defined to take advantage of multiple cores in a networking node forwarding path architecture. SPDB allows concurrent processing of various pieces of header data, metadata, and conditional commands carried in the same data packet by checking a serialization flag set upon creation of the data packet, without needing to serialize the
(Continued)

processing or even parsing of the packet. When one or h more commands in one or more sub-blocks may be processed concurrently, the one or more commands are distributed to multiple processing resources for processing the commands in parallel. This architecture allows multiple unique functionalities each with their own separate outcome (execution of commands, doing service chaining, performing telemetry, allows virtualization and path steering) to be performed concurrently with simplified packet architecture without incurring additional encapsulation overhead.

20 Claims, 10 Drawing Sheets

Related U.S. Application Data

(60) Provisional application No. 62/565,211, filed on Sep. 29, 2017.

(51) Int. Cl.
*H04L 45/02* (2022.01)
*H04L 47/2441* (2022.01)
*H04L 47/32* (2022.01)
*H04L 47/76* (2022.01)
*H04L 49/00* (2022.01)
*H04L 69/22* (2022.01)
*H04L 47/2483* (2022.01)
*H04L 47/35* (2022.01)

(52) U.S. Cl.
CPC ........ *H04L 45/566* (2013.01); *H04L 47/2441* (2013.01); *H04L 47/32* (2013.01); *H04L 47/76* (2013.01); *H04L 49/3009* (2013.01); *H04L 69/22* (2013.01); *H04L 45/08* (2013.01); *H04L 47/2483* (2013.01); *H04L 47/35* (2013.01)

(56) References Cited

U.S. PATENT DOCUMENTS

| | | | |
|---|---|---|---|
| 2014/0280717 A1 | 9/2014 | Frost et al. | |
| 2015/0135009 A1* | 5/2015 | Utaka | G06F 21/62 |
| | | | 714/18 |

FOREIGN PATENT DOCUMENTS

| | | |
|---|---|---|
| EP | 1085711 A1 | 3/2001 |
| EP | 2985971 A1 | 2/2016 |
| WO | WO-2016069182 A1 | 5/2016 |
| WO | WO-2019067945 A1 | 4/2019 |

OTHER PUBLICATIONS

"International Application Serial No. PCT/US2018/053500, International Search Report dated Dec. 3, 2018", 4 pgs.
"International Application Serial No. PCT/US2018/053500, Written Opinion dated Dec. 3, 2018", 5 pgs.
Banchs, A, et al., "Multicasting Multimedia Streams With Active Networks", Proceedings Annual Conference on Local Computer Networks, (Oct. 11, 1998), 150-159.
"European Application No. 18788973.8, Communication dated Oct. 25, 2021", (dated Oct. 25, 2021), 9 pgs.
Bosshart, Pat, et al., "P4: Programming Protocol-Independent Packet Processors", May 15, 2014, XP055207217, DOI: 10.1145/2656877.2656890, retrieved from Internet URL:http://arxiv.org/pdf/1312.1719.pdf [retrieved Aug. 11, 2015], (May 15, 2014), 8 pgs.

* cited by examiner

SELF-DESCRIBING PACKET HEADERS FOR CONCURRENT PROCESSING

CROSS-REFERENCE TO RELATED APPLICATIONS

This patent application is a U.S. national stage filing under 35 U.S.C. § 371 from International Application No. PCT/US2018/053500, filed on 28 Sep. 2018, and published as WO2019/067945 on 4 Apr. 2019, which claims the benefit to U.S. Provisional Application No. 62/565,221, filed on 29 Sep. 2017, and to U.S. application Ser. No. 16/124,770, filed 7 Sep. 2018, which claims priority to U.S. Provisional Application No. 62/565,211, filed on 29 Sep. 2017, the benefit of priority of each of which is claimed herein, and which applications and publication are hereby incorporated herein by reference in their entirety.

TECHNICAL FIELD

This application is directed to computer networks and, more particularly, to a system and method for using self-describing variable-size packet headers for concurrent processing of IP packet headers.

BACKGROUND

Internet Protocol (IP) is the protocol used for today's networks. When an IP packet is received by a networking node, the IP packet is either forwarded based on the destination address (and selected header information, e.g., time to live (TTL) and Differentiated Services Code Point (DSCP) in IPv4 and IPv6 headers) in a broader sense or it is consumed and delivered to one of the higher layers for further processing. In either case, it is possible to have multiple headers that need to be processed. Today, processing of multiple headers is performed sequentially because of the nested encoding of headers and possible separate encryption and integrity protection schemes applied at each layer requiring unwrapping of each header one at a time. For example, the Layer2 header, Hop-by-hop-Header, Routing Header Type X, Routing Header Type Y, Destination header1, Destination header2—Transport Header—Application Data all require unwrapping of each header one at a time.

There are other decisions that need to be made during processing of an IP header, all of which require review of some aspect of the IP packet, For example: prioritizing, marking/DSCP value, updating of flow cache, and gathering operations, administration, and management (OAM) data are other header operations that do not necessarily require the headers to be unwrapped one at a time for sequential processing. In fact, some of these operations may be processed in parallel.

In other cases, multiple headers with encapsulation are required to perform a specific function like virtualization and service chaining. For example, Geneve (Generic Network Virtualization Encapsulation) is a protocol that provides a framework for tunneling for network virtualization where the tunnels are typically established to act as a backplane between the virtual switches residing in hypervisors, physical switches, and the like. The tunnels are used to encapsulate and forward frames from the attached components such as virtual machines or physical links. The Geneve packet format includes a compact tunnel header encapsulated in user datagram protocol (UDP) over either IPv4 or IPv6. A small fixed tunnel header provides control information plus a base level of functionality and interoperability. The payload includes a protocol data unit such as an Ethernet frame. On the other hand, a Network Service Header (NSH) may be imposed on packets of frames to realize Service Function Paths (SFPs). The NSH also provides a mechanism for metadata exchange along the service paths. NSH is the Service Function Chaining (SFC) encapsulation required to support the SFC architecture.

Unfortunately, if a network needs both of these features to be applied on the IP packet, it is not currently possible because of the way encapsulation is defined in these two protocols. As a result, all of the IP headers are processed sequentially, which may lead to significant processing delays within a network.

Moreover, when trying to parallelize processing of a packet it is in general very hard to determine which parts of the processing have mutual dependencies and there is nothing to indicate processing of which parts of a packet depend on another. When this cannot be determined easily, processing needs to be serialized.

SUMMARY

Various examples are now described to introduce a selection of concepts in a simplified form that are further described below in the Detailed Description. The summary is not intended to identify key or essential features of the claimed subject matter, nor is it intended to be used to limit the scope of the claimed subject matter.

Current IP packet encoding is inefficient as it mandates serialized processing of IP packet headers even though higher power processing and memory capabilities are present in the hardware of the network nodes. Also, current IP packet protocols do not have a method for carrying information and logic that may be used to determine what different parts of an IP packet may be concurrently processed. In addition, techniques are desired that permit multiple functions to be performed with respect to an IP packet on the same networking node without requiring excessive additional encapsulation headers.

The systems and methods described herein address these issues in the art by providing a Self-Describing Packet Block (SDPB) having multiple conditional commands, metadata, and flow context information that can be encoded for various use cases in the cloud/DC, Cellular/Mobile backhaul, industrial or general enterprise network market segments. In sample embodiments, the SDPB allows concurrent processing of various fixed headers in the IP packet block where the fixed headers are defined to take advantage of multiple cores in a networking node forwarding path hardware. SPDB allows concurrent processing of various pieces of header data, metadata, and conditional commands carried in the same packet, without needing to serialize the processing or even parsing of the packet. The system and method described herein allows multiple unique functionalities each with their own separate outcome (execution of commands, doing service chaining, performing telemetry, allowing virtualization and path steering) to be performed concurrently with a simplified packet architecture.

According to a first aspect of the present disclosure, there is provided a computer-implemented method for processing data packets in a network. The method includes receiving, at a receiver in a network device, a data flow including a data packet; and one or more processors: identifying multiple sub-blocks blocks from a self-describing block header of the received data packet, wherein a sub-block contains one or more commands to be executed; checking at least one of (1)

a serialization flag on a header of the sub-block to determine whether a command in the sub-block may be processed concurrently with another command in another sub-block and (2) a serialization flag in the command in the sub-block to determine whether the command and another command in the sub-block may be processed concurrently; in response to the checking indicating that the command in the sub-block may be processed concurrently with another command in the sub-block or another command. In another sub-block, distributing the command and the another command to multiple processing resources for processing; and executing the command and the another command in parallel via the multiple processing resources.

According to a second aspect of the present disclosure, there is provided a device for processing data packets in a network. The device includes a receiver that receives data packets, a non-transitory memory comprising instructions, and one or more processors in communication with the memory. The one or more processors execute the instructions from the memory to: receive, at the receiver, a data flow including a data packet; identify multiple sub-blocks from a self-describing block header of the received data packet, wherein a sub-block contains one or more commands to be executed; check at least one of (1) a serialization flag on a header of the sub-block to determine whether a command in the sub-block may be processed concurrently with another command in another sub-block and (2) a serialization flag in the command in the sub-block to determine whether the command and another command in the sub-block may be processed concurrently; in response to the check indicating that the command. In the sub-block may be processed concurrently with another command in the sub-block or another command in another sub-block, distribute the command and the another command to multiple processing resources of the one or more processors for processing; and execute the command and the another command in parallel via the multiple processing resources.

According to a third aspect of the present disclosure, there is provided a non-transitory computer-readable media storing computer instructions for processing data packets in a network. The instructions are executed by one or more processors to: identify multiple sub-blocks from a self-describing block header of a data packet in a data flow received at a receiver of a network device, wherein a sub-block contains one or more commands to be executed; check at least one of (1) a serialization flag on a header of the sub-block to determine whether a command in the sub-block may be processed concurrently with another command in another sub-block and (2) a serialization flag in the command in the sub-block to determine whether the command and another command in the sub-block may be processed concurrently; and in response to the check indicating that the command in the sub-block may be processed concurrently with another command in the sub-block or another command in another sub-block, distribute the command and the another command to multiple processing resources of the one or more processors for processing in parallel.

In a first implementation of any of the preceding aspects, the one or more commands comprise conditional commands having one or more command parameters, the command parameters containing data indicating a value that defines a set of operation conditions for the conditional command.

In a second implementation of any of the preceding aspects, a conditional command comprises a command and at least one condition that must be satisfied to execute the command.

In a third implementation of any of the preceding aspects, the conditional command instructs the processing resources to modify a resource allocation for a data flow of data packets, to modify a chosen next hop for the data flow of data packets, or to update a flow context for the data flow of the data packets upon occurrence of the at least one condition.

In a fourth implementation of any of the preceding aspects, the conditional command instructs the processing resources modify data in the data packet, modify a chosen next hop for the data packet, modify a priority for the data packet, drop the data packet, buffer the data packet, or modify metadata in the data packet upon occurrence of the condition.

in a fifth implementation of any of the preceding aspects, the sub-block comprises metadata. For processing by the one or more commands.

In a sixth implementation of any of the preceding aspects, the metadata comprises at least one global parameter having a value to support evaluation of all conditional commands in a header of the received data packet, in a seventh implementation of any of the preceding aspects, the sub-block includes a command header followed by a condition and at least one set of actions.

in an eighth implementation of any of the preceding aspects, the sub-block includes at least one type, length, and value (TLV) parameter including at least one of a condition, metadata, a condition followed by a command, and a set of parameters particular to the sub-block.

In a ninth implementation of any of the preceding aspects, the TLV parameters include a set of shared parameters passed by the processing resources based on an indication in the sub-block header.

The method can be performed and the instructions on the computer readable media may be processed by the apparatus, and further features of the method and instructions on the computer readable media result from the functionality of the apparatus. Also, the explanations provided for each aspect and its implementation apply equally to the other aspects and the corresponding implementations. The different embodiments may be implemented in hardware, software, or any combination thereof. Also, any one of the foregoing examples may be combined with any one or more of the other foregoing examples to create a new embodiment within the scope of the present disclosure.

BRIEF DESCRIPTION OF THE DRAWINGS

In the drawings, which are not necessarily drawn to scale, like numerals may describe similar components in different views. The drawings illustrate generally, by way of example, but not by way of limitation, various embodiments discussed in the present document.

FIG. is a schematic diagram of a sample network for routing packets with conditional commands.

Figure 3:
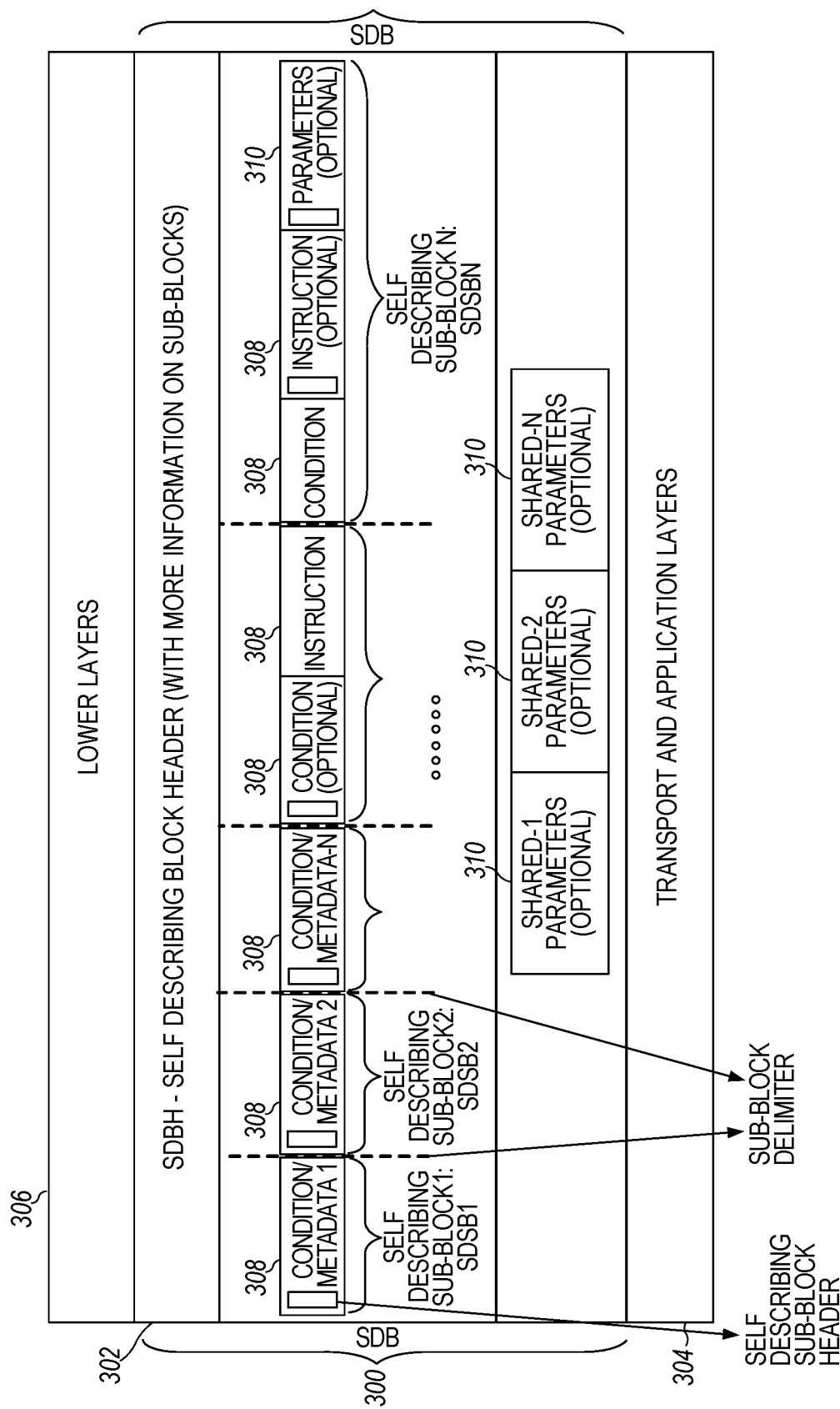

FIG. 3 is a block diagram of a self-describing block (SDB) including an SDB header (SDBH) according to a sample embodiment.

Figure 4:
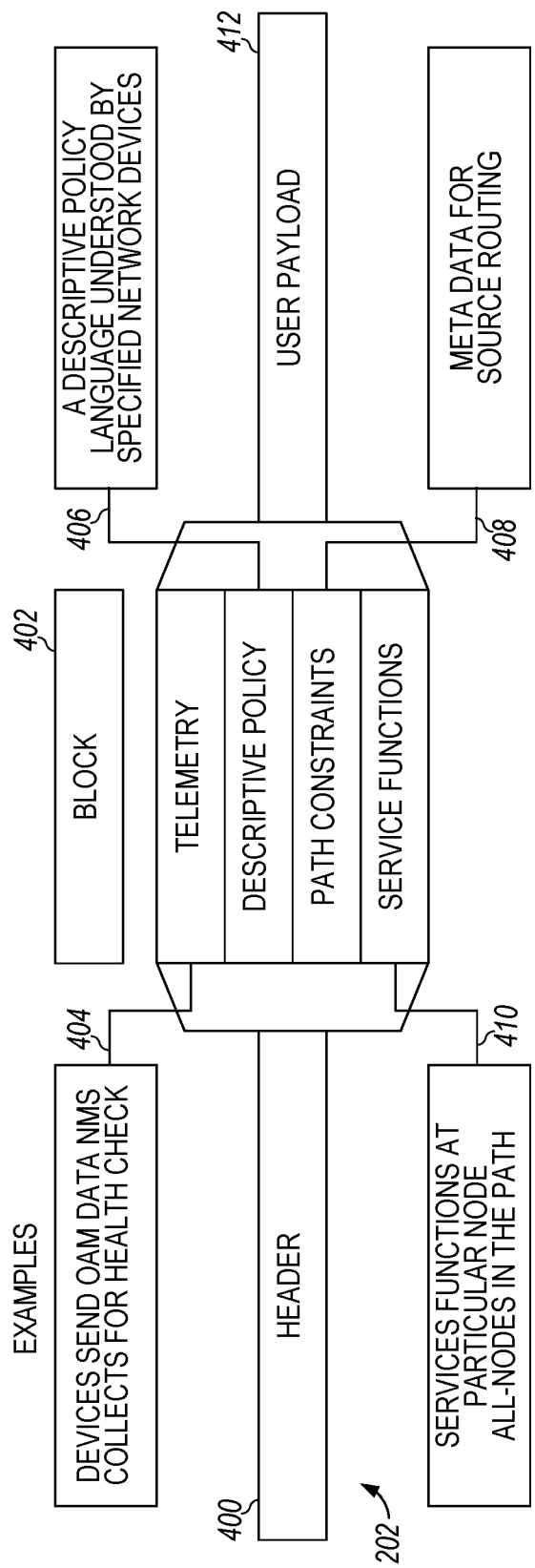

FIG. 4 illustrates a packet having a block divided into four sub-blocks including a telemetry sub-block, a descriptive policy sub-block, a path constraints sub-block, and a service functions sub-block.

Figure 5:
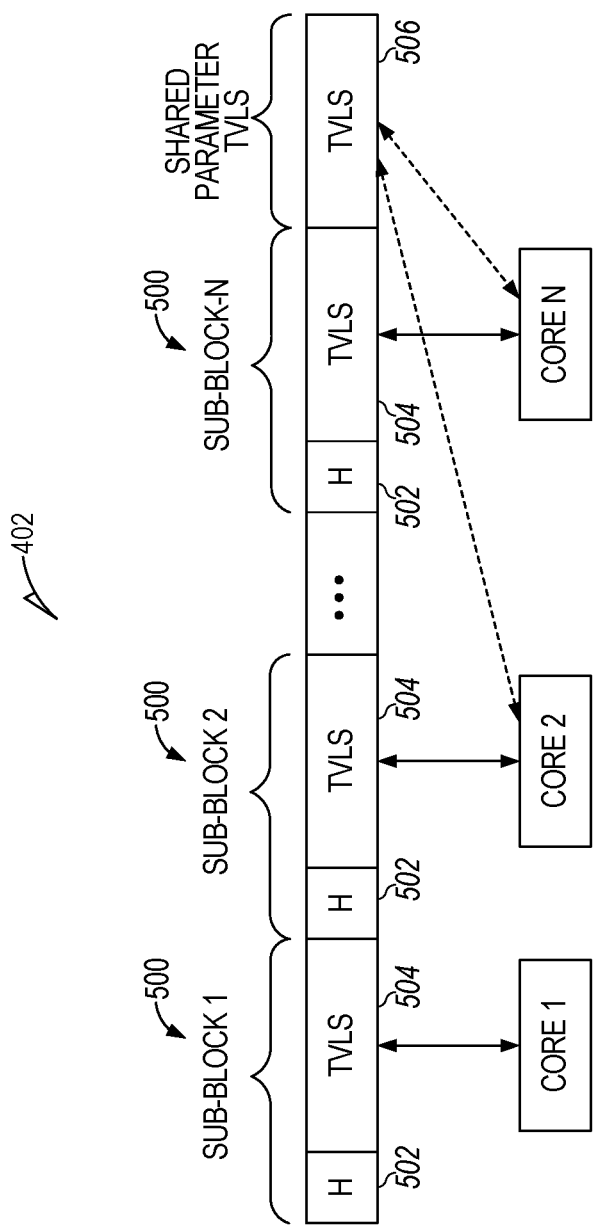

FIG. 5 illustrates a packet divided into sub-blocks with headers describing how parallelization may be enabled in the processing of a packet header in a sample embodiment.

Figure 6:
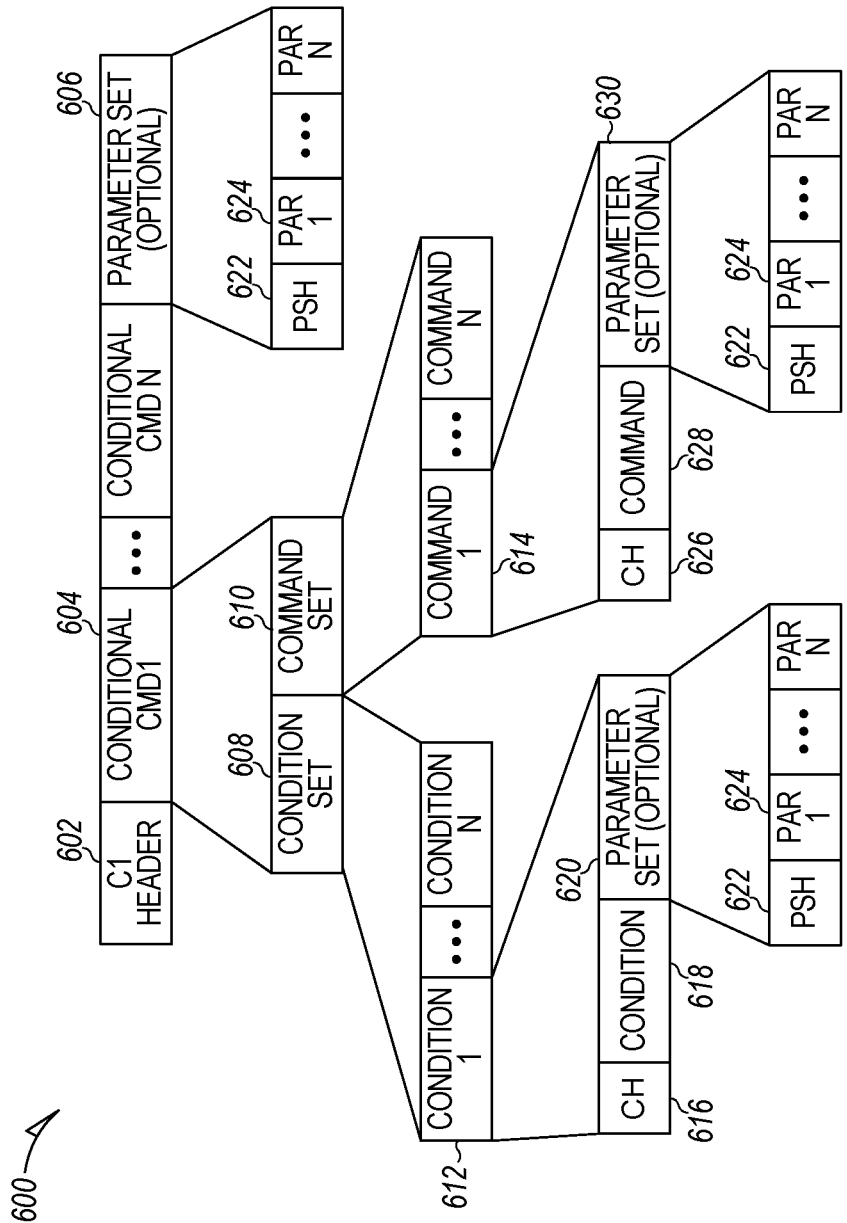

FIG. 6 is a schematic diagram of an example conditional command block for use in a data packet header in a sample embodiment.

Figure 7:
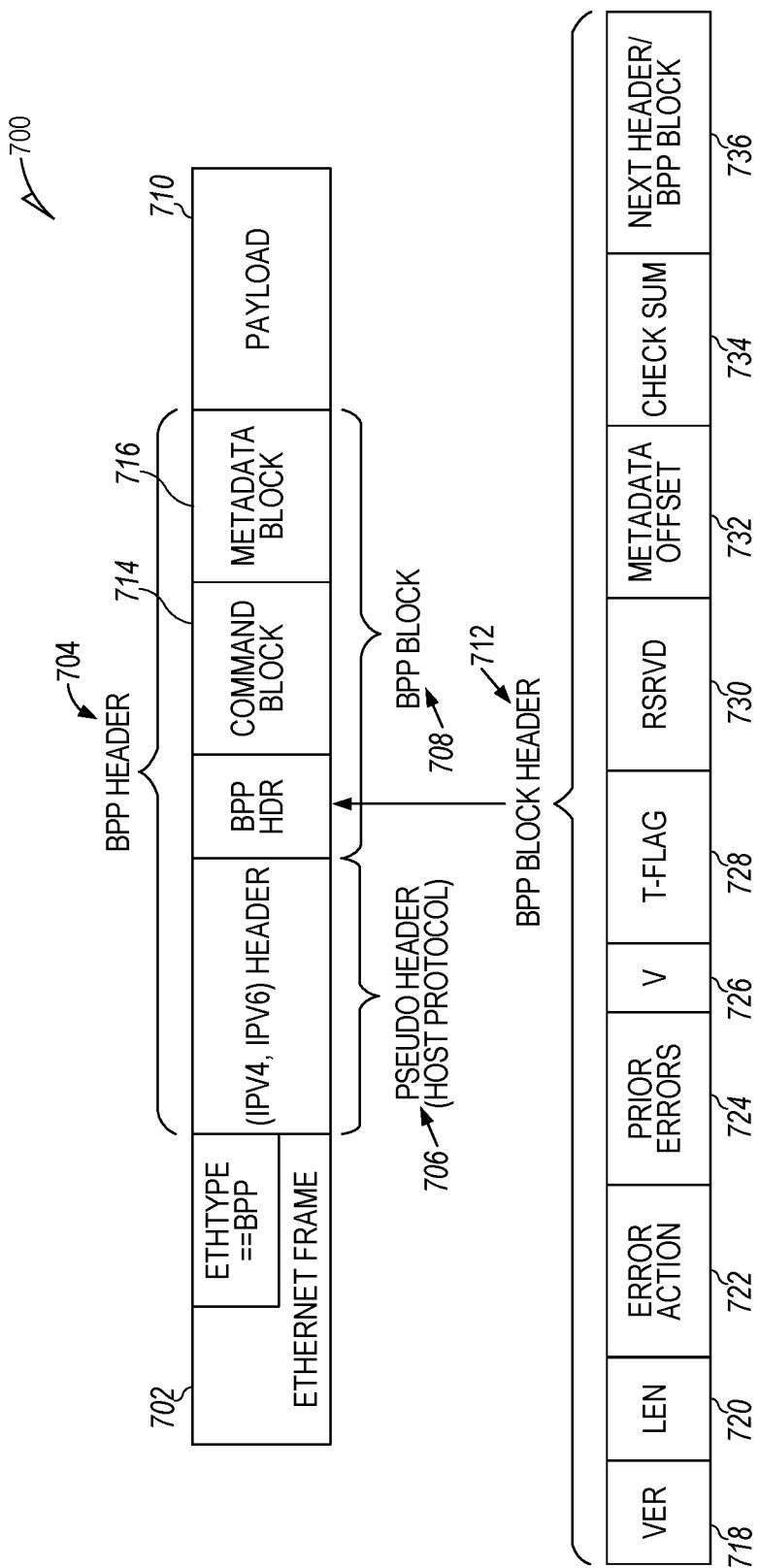
Figure 8:
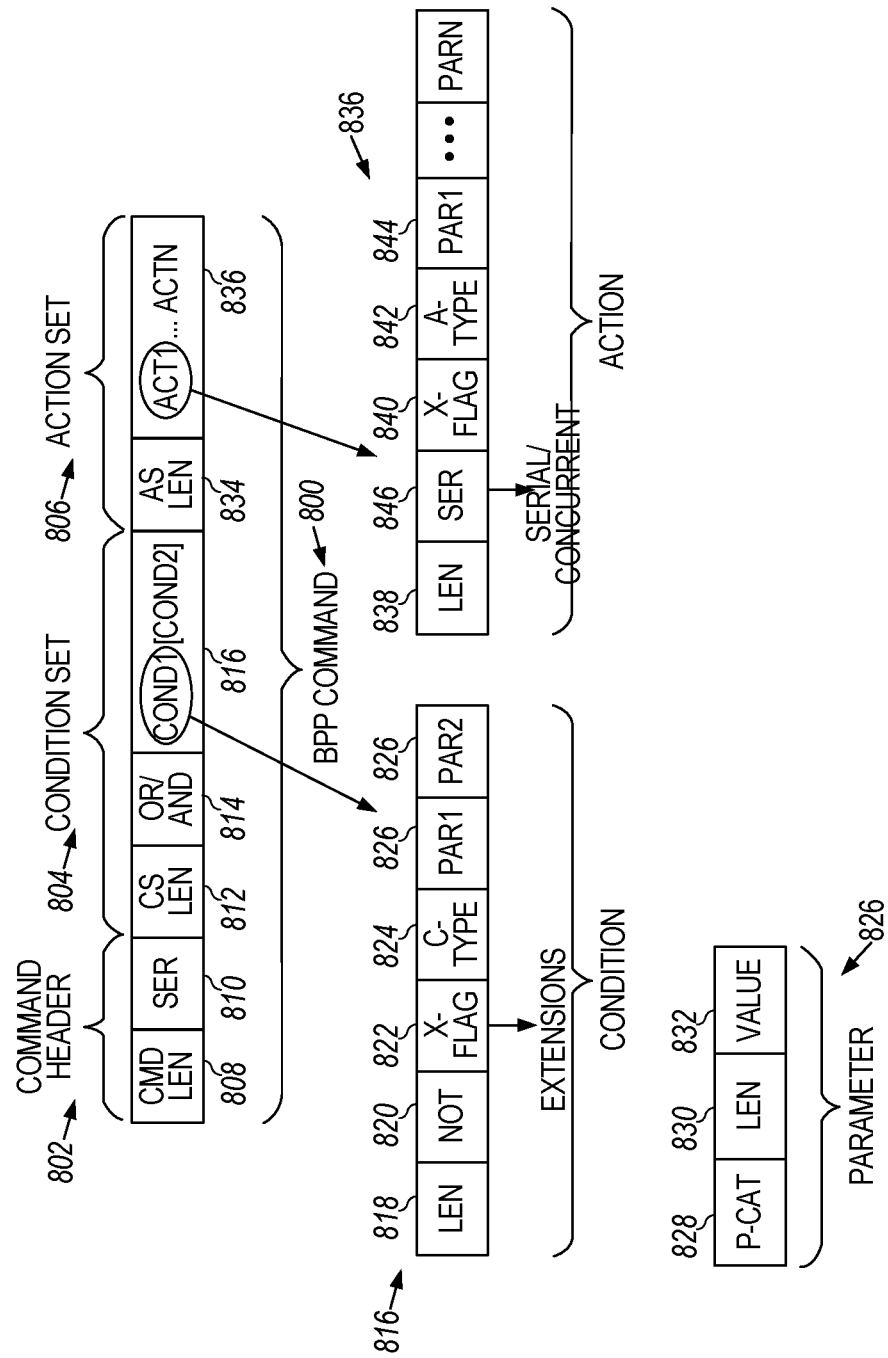

FIG. 7 is a schematic diagram of an example Big Packet Protocol (BPP) header that can be employed to implement a conditional command block in a sample embodiment, FIG. 8 is a schematic diagram of a BPP command including a BPP block header, a condition set, and an action set in sample embodiments.

Figure 9:
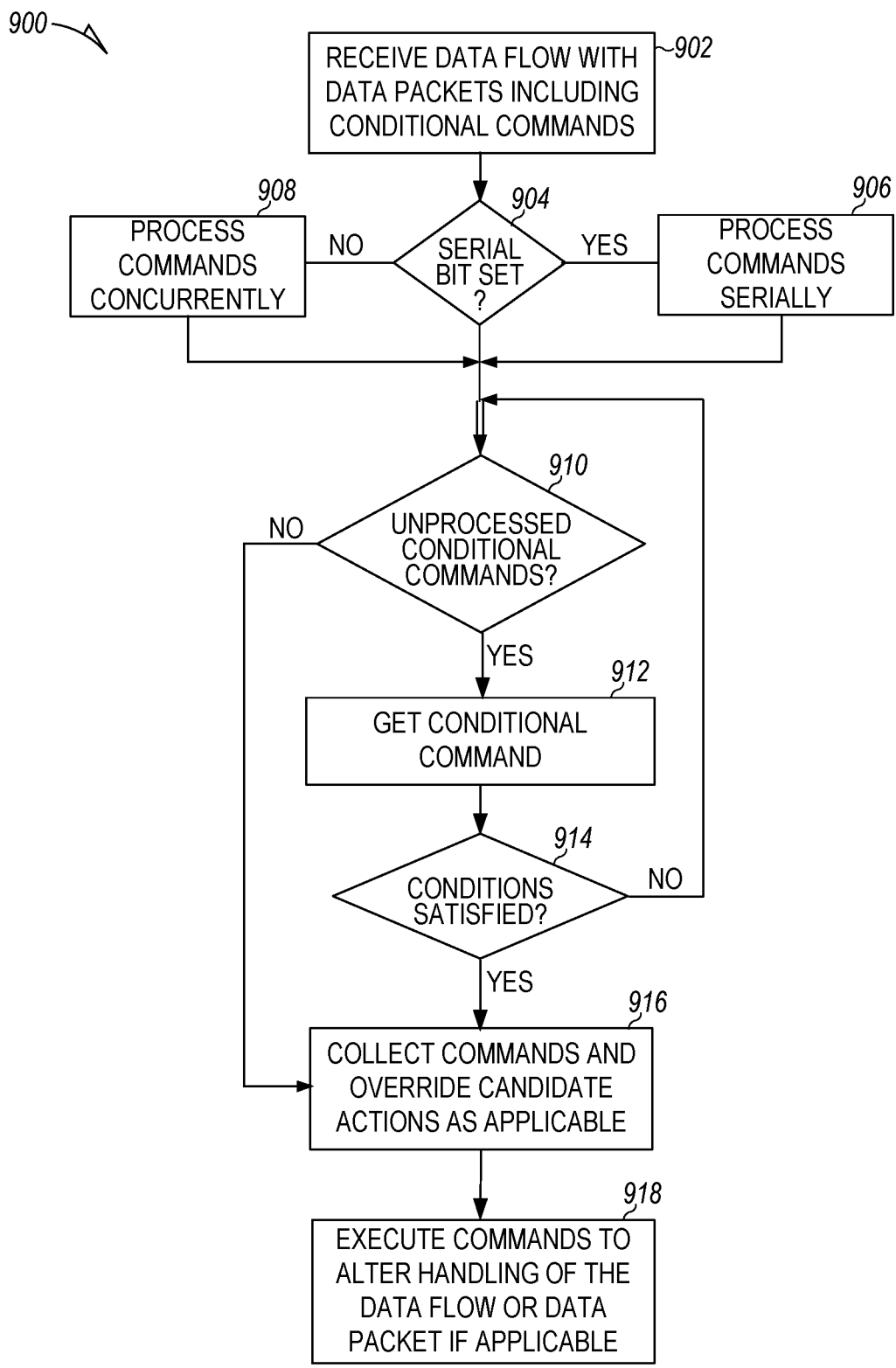

FIG. 9 is a flowchart of a sample method for implementing conditional commands carried by data packets in a sample embodiment.

Figure 10:
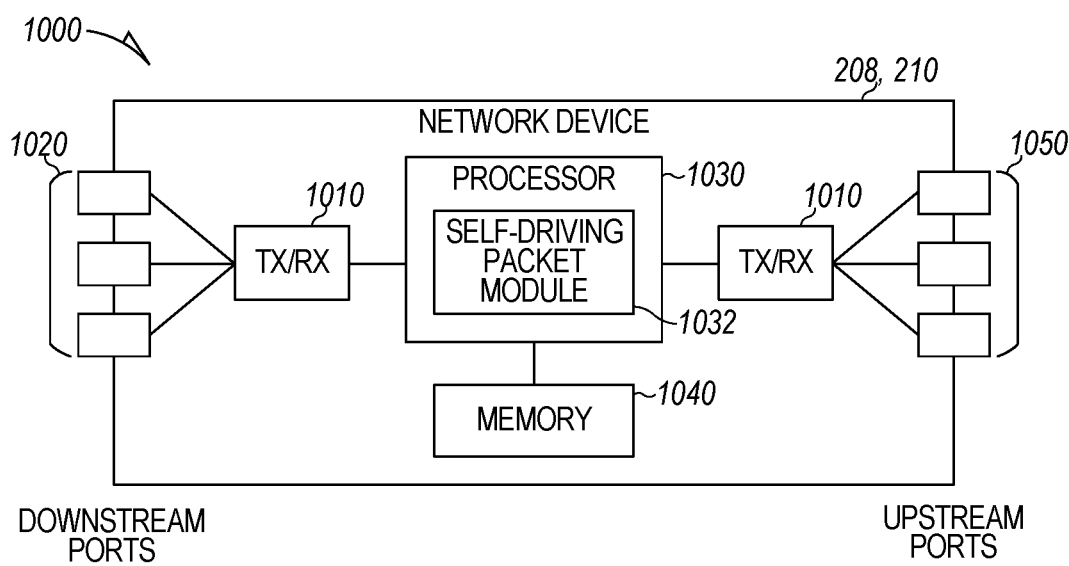

FIG. 10 is a block diagram illustrating circuitry for performing methods by a network node to process self-describing packet headers for parallel processing according to a sample embodiment.

DETAILED DESCRIPTION

It should be understood at the outset that although an illustrative implementation of one or more embodiments are provided below, the disclosed systems and/or methods described with respect to FIGS. 1-10 may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As noted above, current encoding is inefficient as it mandates serialized processing of all IP packet headers even though higher power processing and memory capabilities are present in the hardware of the network nodes. Today, concurrency of IP packet processing in the hardware is only available at the packet level. There is a need. To make concurrent processing more widely available for processing of sub-blocks of IP packets, including IP packet headers, in order to allow multiple functionalities to be performed on the packet with low latency. A method is desired that will work in the context of current protocols to carry information and logic of what different parts of a packet can be concurrently processed in order to make concurrent processing more widely available for IP packets. Also, a technique is desired whereby multiple functionalities may be performed on the same networking node without excessive additional encapsulation headers. For example, there are couple of existing technologies for overlay and underlay networks, but they do not describe the concurrent processing on the sub-blocks of one packet and are conflicting to each other even if both are needed in some deployment use cases (e.g., Geneve and NSH). Using Overlay, if an IP packet needs service chaining in a virtualization environment (cloud), this is almost impossible with the way NSH and Geneve are defined. Also, using Underlay, if source/segment routing with service chaining along with in band OAM/telemetry is to be performed on the packet, there is no existing defined mechanism to enable such functionality.

Some of the existing technologies use encapsulations (NSH, Geneve, multi-protocol label switching (MPLS)-in-UDP, Segment Routing (SR)-in-UDP, General Packet Radio Service (CPRS) Tunneling Protocol (GTP), Locator/Identifier Separation Protocol (LISP), Virtual Extensible LAN (vxLAN), etc.) with additional layers which will defeat the latency requirements and increase complexity (in certain deployment scenarios like Internet of things (IoT) and 5G area with 1 msec data plane latency and 10 msec control plane latency). No prior art has described packet encoding which enables such intersecting functionalities in one place. While metadata specified in the packet block can be similar to NSH, there is no enablement for concurrent processing or multiple features without additional encapsulation overhead. The system and method described herein addresses these and other shortcomings in the prior art.

As will be explained in more detail below, data packets may include commands for processing by one or more nodes as the data packets traverse a network. Techniques for processing conditional packets will first be described and then techniques for enabling concurrent processing of such conditional packets will be described.

Figure 1:
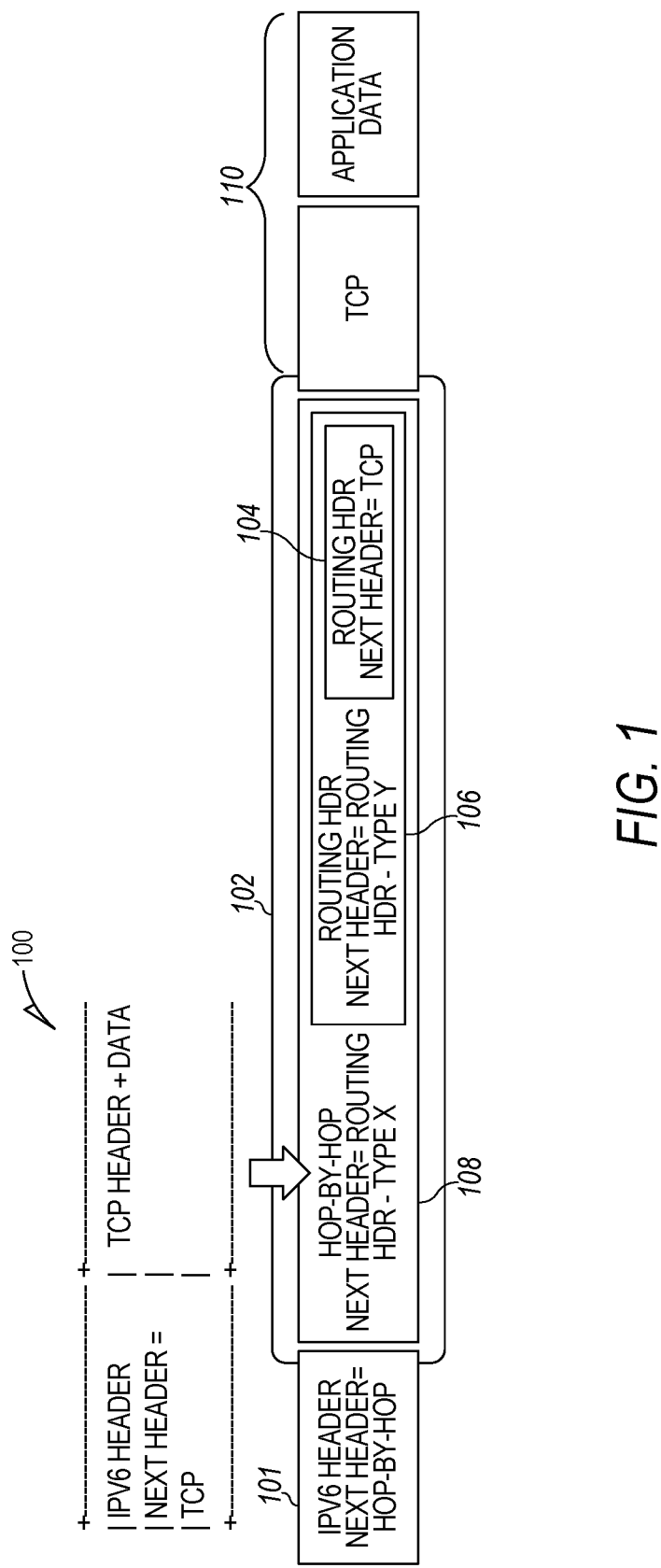
FIG. 1 represents an example of IPv6 extension headers if both source routing, mobility and hop-by-hop options are to be performed on a particular node.

FIG. 1, provides an example of IPv6 extension headers if both source routing, mobility and hop-by-hop options are to be performed on a particular node. After application of multiple extension headers based on the features that need to be enabled on various nodes to process this packet (with two routing headers for mobility and source routing), the original packet 100 appears as shown in FIG. 1. As illustrated, the original packet 100 includes the IPv6 header block 101 with encapsulated TCP header 102 including routing header 104 (Next Header=TCP), routing header 106 (Next Header=Routing Hdr–Type Y), and the Hop-by-Hop header 108 (Next Header=Routing Hdr–Type X). In this case, all three headers 104, 106, and 108 would be sequentially processed. In other words, the headers "wrap" payload 110 that contains other headers, where borders between multiple layers of headers are not clear in advance and positioning of header information depends on the specific layering applied. Each layer can have its own encapsulation or integrity checks that get in the way of concurrent processing. As a result, serial unwrapping is required, which is not desirable for lots of low latency applications (like 5G networks).

In general, a data packet includes a header that holds routing information and a payload that holds the communicated data. As described in related U.S. patent application Ser. No. 16/124,770, filed Sep. 7, 2018, by Renwei Li, et al., and titled "Self-Driving Packets With Conditional Commands," conditional commands may be inserted in, or attached to, the header and outside the packet payload (e.g., in the header and/or between the header and the payload). As a result, the conditional commands can be read without employing Deep Packet Inspection (DPI) and without decrypting the packet payload. The conditional commands can be included in the data packet at the source node into the network domain and employed by other network nodes traversed by the packet. The conditional commands may also be included in the data packet by a network node in some cases.

A conditional command includes a condition and a command. The condition indicates an item that must be satisfied before the command is executed. When the condition is not met, the command is ignored. The command indicates an action or set of actions to be taken by the node processing the data packet upon occurrence of the condition. The conditional command may also include condition parameters, command parameters, and/or common/shared parameters. Such parameters include data that modify the outcome of the assessment of the condition and/or modify the command at the processing nodes. By including conditional commands in the data packet header, the source node can control how the data flow and/or how particular packets are handled when traversing the network upon the occurrence of the condition(s). Hence, conditional commands allow for in-hand control of network functions, where in-band indicates that control information is forwarded in the same channel as the communicated data. For security reasons, such conditional commands may be limited in scope to corresponding data flows, corresponding sub-flows, and/or corresponding packets.

For example, conditions assess (e.g., compare) the status of an item at a node communicating the data packet. Such conditions may include a property of the data packet itself (e.g., the packet length), a context of the data flow (e.g., a packet counter or a service level objective for the flow), a state of the network device (e.g., the depth of the egress queue at a router), and/or other node conditions (e.g., node address). The commands indicate how a data packet and/or a corresponding data flow should be treated, by the node upon occurrence of the condition. For example, the command may alter packet routing (e.g., drop packet, queue packet, change packet priority, change next hop), alter packet header contents or BPP block contents (e.g., add/change metadata, add/change packet header data, swap header field with meta data field, increment packet counters), change resource allocations at the node (e.g., update flow context including flow cache, reservations, flow state, flow metadata), update flow priority/routing, execute custom functions at the node, change node states, etc. Flow context, as used herein, may refer to a flow cache, flow cache reservations, flow state, flow metadata such as a presence of flow cache entry, a value of a data field in a corresponding flow cache entry such as a number of packets, and updated router state such as a queue occupancy level, However, for security or regulatory reasons, the commands may not alter the data in the packet payload (e.g., user data). Parameters can then add variables or other contextual information to support interpretation of the conditions and/or commands.

Accordingly, conditional commands provide control of a wide range of network functionality that can be customized to achieve application goals without interfering with network function relative to unrelated data flows. Further, conditional commands allow network functionality to be changed dynamically while data packets are in transit through the network and not based solely on network traffic projections, For example, a data packet may be dropped in transit upon determination that latency is too great, which may allow the data packet to be discarded immediately instead of using network resources only to be discarded at the destination. As another example, a counter in the data packet may be incremented for each node along the path with resource usage in excess of a specified amount. This may allow verification that quality of service (QoS) guarantees are met in real time. As another example, a data flow/data packet can be re-routed and/or re-prioritized based on actual available bandwidth, latency, etc. along a path.

Figure 2:
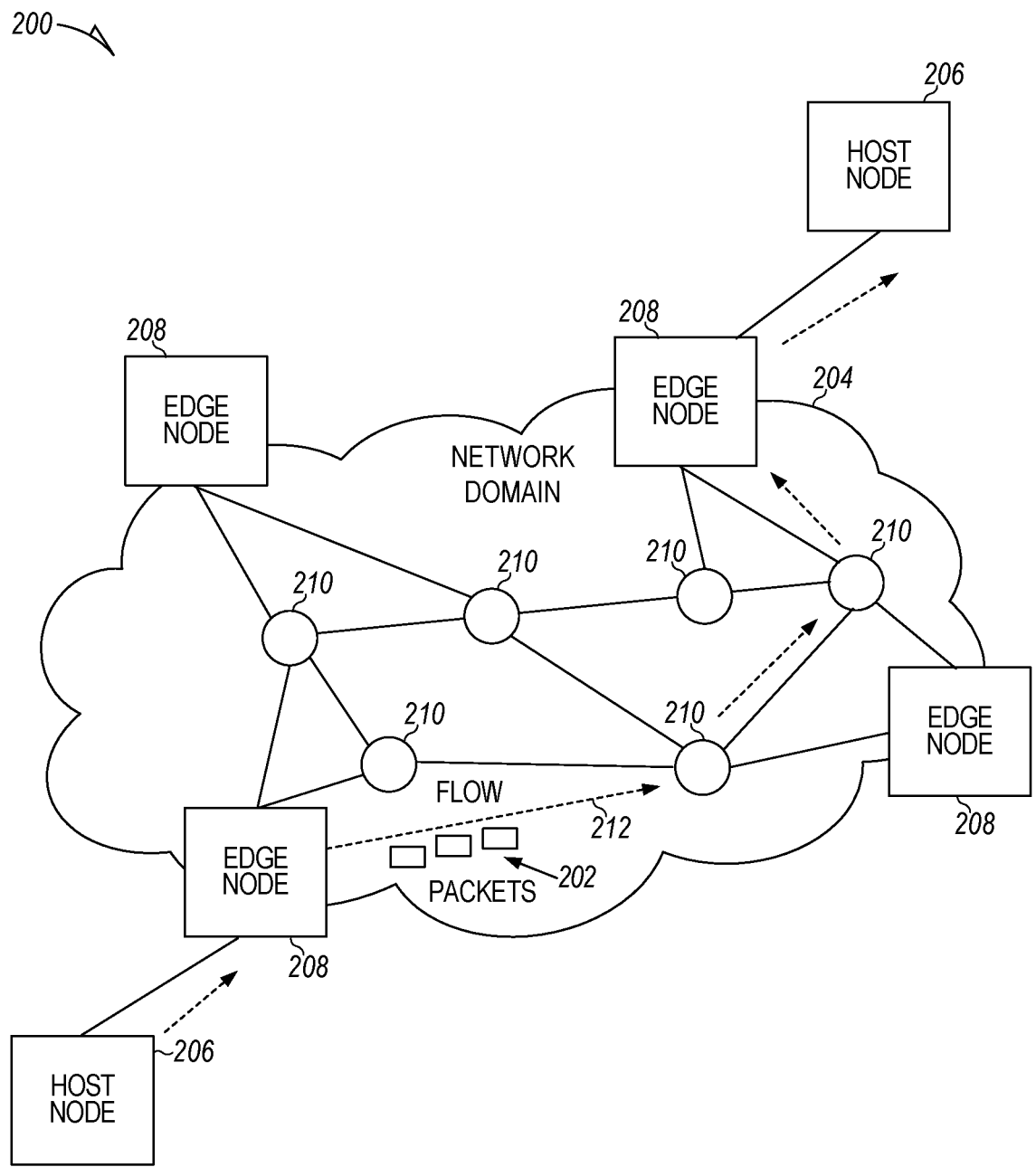

FIG. 2 is a schematic diagram of a sample network 200 for routing data packets 202 with conditional commands. The network 200 includes a network domain 204 including host nodes 206. The network domain 200 includes edge nodes 208 that act as ingress and egress points and internal nodes 210 that communicate data, such as a data flow 212 of data packets 202. Also, the host nodes 206 may be connected to edge nodes 208 on 2g/3g/4g/5g radio. In that case, edge node 208 may be a router connected to the base station on the mobile phone network (Evolved Node B (eNB)).

Host nodes 206 are nodes that operate applications and wish to communicate. Such host nodes 206 may communicate by transmitting data flows 212 via the network domain 204. A data flow 212 is a group of related communications between a common set of end points, such as host nodes 206. For example, applications operating on the host nodes 206 can initiate a communication session. The data exchanged during the communication session may be transmitted as a data flow 212. The data in the data flow 212 is separated into data packets 202 for transmission. A data packet 202 includes a header with routing information and a payload with the data exchanged between the host nodes 206 (e.g., as part of the communication session.) The payload may be encrypted in some cases and may not be readable by the network domain 204 connecting the host nodes 206.

Network domain 204 is group of interconnected network components controlled by a cannon set of networking policies. It should be noted that, while network domain 204 is a single domain, the present disclosure may be deployed in a multi-domain context, The edge nodes 208 are network devices ti capable of converting packets 202 into a form that complies with the policies of the network domain 204, For example, the edge nodes 208 may implement security policies for the network domain 204, change data packet 202 network addresses according to network domain 204 addressing schemes, manage the data flow 212 through the network domain 204, etc. Hence, the edge nodes 208 act as ingress and egress points into the network domain 204. As a particular example, the edge nodes 208 may determine paths) across the network domain 204, encapsulate the packets 202 to cause the packets 202 to proceed through the network domain 204 via tunnels, etc.

The edge nodes 208 are interconnected by a series of internal nodes 210 and corresponding links, depicted as lines. The internal nodes 210 are network devices, such as routers, that are configured to read data packet 202 header information and to process and forward the data packets 202 according to the header information. The edge nodes 208 and/or the internal nodes 210 may identify data flows 212 and determine that packets 202 and corresponding context information are associated with a corresponding flow 212. For example, a data flow 212 can be identified by a tuple containing several key parameters, such as source Internet Protocol (IP) address and source port, destination IP address and destination port, Type of Service (ToS), input interface, etc, In other cases, data flow 212 can be identified by a flow specifier. The edge nodes 208 and the internal nodes 210 may also contain flow caches that maintain context information related to the data flow 212. For example, a flow cache may contain a flow cache entry associated with each data flow 212 and/or a group of aggregated data flows 212 traversing the node containing the flow cache. The flow cache entry may contain data flow 212 duration information, start time, a source address, a destination address, a number of packets 202 transmitted, an amount of data transmitted in the flow, and/or other data flow 212 related statistical information.

In sample embodiments, the network domain 204 can be modified to employ conditional commands for routing the data packets 202. Such conditional commands may also be employed to manage other data flow 212 related actions, such as updating data flow 212 context, directing maintenance of statistics related to the data flow 212, updating packet 202 metadata and headers, etc. Hence, the conditional commands allow the packets 202 to direct how the packets 202 should be routed (e.g., self-driving) and/or how the data flow 212 should be managed instead of relying on network policies at the internal nodes 210 and/or edge nodes 208. A conditional command is positioned in the packet 202 header by the edge node 208 acting as an ingress node (e.g., the head-end node). The conditional conunand includes a condition, a command, and may also include one or more parameters. The condition indicates an item that must be satisfied before the command is executed. When the condition is not met, the command is ignored. The command indicates an action or actions to be taken by the node processing the data packet 202 upon occurrence of the condition. Also, as will be further explained below, the edge nodes 208 and/or internal nodes 210 may also set bits indicating whether the conditional commands inserted into the data packets may be concurrently processed.

In one example, the host node(s) 206 may communicate with the edge node(s) 208 to setup a communication. The host nodes(s) 206 may express the application's communication goals to the edge node(s) 208. On the other hand, the communication can be inherent, namely, based on some parameters of the data packet, such as the source IP address. The edge node 208 can determine what kind of treatment a data packet has to be given in the network domain 204 and hence generates conditional commands accordingly. The ingress edge node 208 can then generate a conditional command based on the application's communication goals and append the conditional command on the data packets 202 of the data flow 212 as such packets 202 enter the network domain 204. In sample embodiments, when the data packet 202 is created, a bit is set within the packet to specify whether the conditional command in the sub-packet can be concurrently processed or is dependent upon the processing of other commands. In another example, a network provider may determine to inject conditional commands into the data packets 202 at the edge node(s) 208 without a request from the host node(s) 206. For example, the network provider may determine to add conditional commands for general network domain 204 maintenance purposes and/or to achieve some goal obtained from other channels, such as from a controller or an Operations Support System (OSS).

The internal nodes 210 obtain the conditional commands from the packets 202 during routing. The internal nodes 210 may store routing commands for the data flow 212. Such routing commands may include data flow 212 specific data in a flow cache and/or general routing commands, such as network domain 204 policies, IP routing commands, media access control (MAC) routing commands, multiprotocol label switching (MPLS) commands, and/or other routing commands commonly employed for routing packets 202 via a network domain 204. When the condition(s) for the conditional command(s) are met, the internal nodes 210 can execute the associated command(s). Such commands may be complementary commands that are executed in addition to the stored routing commands (e.g., update flow context, change data packet header data, etc.) In other cases, the commands may be override commands that are executed instead of the stored routing commands (e.g., drop packet, change next hop, etc.)

The internal nodes 210 may also obtain parameters from the conditional commands. The parameters provide data to clarify the condition(s), the command(s), or both. For example, a condition may include a comparison, such as less than, greater than, equal to, prefix of, etc. A condition parameter may then contain data indicating a value to support evaluation of the condition. For example, the condition parameter may indicate what value is being compared (e.g., a threshold value to compare an item against or a specific data item to compare against), such as node address is compared to X, data packet 202 field (e.g., time to live (TTL) field, next hop prefix, etc.) is compared to X, Transmission Control Protocol (TCP) Keep Alive is compared to X, flow cache entry is compared to X, queue occupancy is compared to X, etc., where X is a variable set upon creation of the conditional command. X may be set to include many items, such as a data value, reference to a piece of metadata/data carried in the packet 202 and/or a packet header field, a reference to a piece of metadata related to the data flow 212 that is maintained in state on a node 208, 210 outside the packet 202, a reference to a well-defined data item, such as an interface statistics parameter, etc. The condition and the conditional parameter allow the internal nodes 210 to check a wide range of definable conditions, such as properties of the data packet 202 carrying the conditional command, data flow context, internal node 210 router state, data packet 202 upper layer information (e.g., Open Systems Interconnection (OSI) model layer four and above), node conditions, etc. It should be noted that a condition could be set to always evaluate to true in order to cause the command to execute at each internal node 210 that routes the packet 202. Otherwise, the condition is set to trigger the command only upon the occurrence of the situation desired by the egress edge node 208.

As another example, the command(s) include one or more primitives that are to be applied upon occurrence of the condition. A primitive is a function that is understood by the internal node 210. A command parameter contains data indicating a value that defines a set of operation conditions for the command. For example, the command parameter may indicate what item should be acted upon by the command and/or the extent to which the item should be acted upon/changed. For example, the command may initiate functions at the internal nodes 210 such as, packet 202 drop, packet 202 queue, packet 202 priority, update packet 202 field (e.g., mark, add, swap, replace, increment, and/or upda field), update data flow 212 context, update packet 202 metadata (e.g., mark, add, swap, replace, increment, and/or update metadata), set data flow 212 next hop, allocate internal node 210 resource, initiate custom function, etc. The command parameter may then indicate which data packet 202 queue to employ, which data packet 202 priority to employ, which field to update, and what value to place in such field, etc. As a specific example, a command may indicate that a resource should be allocated at the internal node 210, and parameters may indicate the requested resource type, the resource qualification (e.g., size/amount of allocation), the duration of allocation, etc. Hence, the command and the command parameter allow the internal nodes 210 to execute a wide range of functions. By executing the command upon occurrence of the condition, a wide range of sophisticated actions can be taken by the internal nodes 210 without prior programming that is particular to the data flow 212, For example, an internal node 210 could raise/lower data flow 212 priority in response to network traffic, preemptively drop packets 202 with high latency, change packet data flow 212 routing paths in response to network traffic, update, and/or swap packet 202 counter(s)/fields/metadata to provide insight as to conditions at internal nodes 210 along the path, etc. Further, global parameters may also be employed that contain data indicating a value that is global to the packet 202 header. Hence, a global command may affect both the condition and the command as desired.

After being forwarded across the network domain 204, the packets 202 are received by an edge node 208 acting as an egress node for the data flow 212. The edge node 208 can remove and/or process the conditional commands before forwarding the packets 202 to the host node 206 at the data flow 212 destination. For example, the edge node 208 can read the header fields and/or metadata in the data packets 202. The edge node 208 may also report results to the host node(s) 206. For example, the edge node 208 may send reports including data from several packets 202 to indicate that the network domain 204 has complied with service level agreements (SLA). As another example, the edge node 208 may communicate in real time when the SLA has been breached.

Thus, conditional commands allow for a broad range of functionality to be implemented by a network domain 204 based on in-band signaling that can be tailored on a per data flow 212 and/or even on a per packet 202 basis. Accordingly, conditional commands provide for significant improvement of the functionality, flexibility, and efficiency of the network domain 204. It should also be noted that while an OSI layer three point to point network (e.g., IP network) is shown, conditional commands can be implemented in other network types, such as Open Systems Interconnection (OSI) layer two networks, Software Defined Networks (SDNs), Multiprotocol Label Switching (MPLS) networks, overlay networks like vxLAN or Geneve, etc.

In sample embodiments described herein, to mitigate the effects of serial unwrapping of the headers, the headers for data packets 202 to be transmitted in such a network 204 are defined to include a new self-describing packet block with a self-describing block header and multiple sub-blocks with clear demarcation for various functionalities to be done on each router.

FIG. 3 illustrates such a self-describing block (SDB) 300 including an SDB header (SDBH) 302 according to a sample embodiment. As illustrated, the SDB 300 may be located between the transport and application layers 304 and the lower level IP layers 306. The SDBH 300 can potentially indicate various sub-headers present at fixed offsets and offset where shared parameters are present. The SDBH 300 indicates what ub-blocks are encoded as part of the metadata, conditions, and commands type, length and values. Each sub-block 308 as shown can contain a sub-block header and multiple type, length, and values (TLVs) where these TLVs may be pre-defined with a pre-defined length as defined by the Internet Engineering Task Force (IETF) to enable correct offsets to read. Conditional commands within these sub-blocks may share parameters 310 for serialized and parallel processing of the commands as described in more detail below. These TLVs can be a condition, metadata, condition followed by a command and optionally a set of parameters specific to that particular sub-block. Some of these sub-blocks are general purpose and programmable with pre-defined fixed lengths. A sub-block can contain a combination of types defined in the self-describing sub-block header. A sub-block header can point to the "some" or "all" of the shared parameters defined to read/process this sub-block.

The sub-blocks can point to different conditional commands, metadata or state to be applied in a network node 208/210 or every network node 208/210 along the path (in some cases these sub-blocks denote different features). For example, FIG. 4 illustrates a packet 202 having a header 400, a block 402 divided into four sub-blocks including telemetry sub-block 404, descriptive policy sub-block 406, path constraints sub-block 408, and service functions sub-block 410, as well as a payload 412. In sample embodiments, the telemetry sub-block 404 includes OAM data from devices, such as OAM data collected at one or more network nodes 208/210 along the path by network nodes 208/210 for a health check. The descriptive policy sub-block 406 includes a descriptive policy language to be applied at every network node 208/210 that is understood by specified network devices. Path constraints sub-block 408 includes metadata for source routing including preferred path and/or explicit path commands, while service functions sub-block 410 specifies service functions to be applied at particular or all nodes in the network path. A node 208/210 receives this packet 202 with these sub-block processes all without incurring an additional tax in processing time or additional encapsulation/de-capsulation overhead, even when similar functionality has to be achieved with current IETF definitions of segment routing/network service header/inhand operations, administration and maintenance (SR/NSH/IOAM) headers. It is possible some of the sub-block features are to be done only on specific nodes in the path and that can be encoded with conditional commands and metadata constructs on the block. However, it will be appreciated that in the example described below with respect to FIG. 5 that all sub-block functions in the SDB may be needed on all nodes.

FIG. 5 illustrates a packet divided into sub-blocks 500 with headers 502 describing how parallelization may be enabled in the processing of a packet header in a sample embodiment. In this example, global parameters are passed based on the sub-block header 502 indication of the type of block (e.g., a type of block that may or may not be processed in parallel). As illustrated in FIG. 5, a mechanism is provided to indicate a main packet marker for each sub-block. For example, each sub-block 500 of block 402 includes a header 502 indicating whether or not the associated sub-block 500 has any interdependencies with another sub-block. If not, the header indicates that the associated sub-block 500 has TLVs 504 that may be concurrently processed with other sub-blocks. For this purpose, independent block definitions may be defined to more readily identify the sub-blocks 500 that enable concurrent processing by respective core processing resources. Also, the TLVs 504 for encapsulated packets may store the processed global parameters in a shared parameter memory 506 that may be accessed by other packet processing devices on the same or a different network node for subsequent processing of the encapsulated values. It will be appreciated by those skilled in the art that the core processing the outgoing packet (core$_1$ ... core$_n$) might generate less or more total bytes than the combined input, so flexibility in the length of the data packets is desirable.

Thus, parallelization in processing a packet is being done with shared global parameters 506 that are passed based on the sub-block header indication 502. Independent block definitions and actual encoding rules would be defined in corresponding standards.

FIG. 6 is a schematic diagram of a sample conditional command block 600 for use in a data packet header, such as data packet header 402 contained in a data packet 202 in a data flow 212. For example, command block 600 may be employed to implement a conditional command block of the type described in related U.S. patent application Ser. No. 16/124,770, filed Sep. 7, 2018, by Renwei Li, et at, and tided "Self-Driving Packets With Conditional Commands." The conditional command block 600 contains a conditional command set header 602, one or more conditional commands fields 604, and may contain a global parameter set field 606. The conditional command set header 602 is a block of data that indicates the presence of conditional command block 600 as well as associated administrative data, such as conditional command block 600 length, number and size of conditional commands, number and size of the parameter set(s), error checking data, version data, flags related to the entire conditional command block 600, etc. The conditional commands field(s) 604 contains one or more conditional commands (e.g., 1-n, where n is any integer value). The conditional command set contained in the conditional commands field(s) 604 may be encoded in any order as execution of conditional commands may not be sensitive to order and may even occur in parallel. The global parameter set field 606, when present, contains parameters that are relevant to both conditions and commands and/or relevant to multiple conditional commands, depending on the example.

The conditional commands field 604 contains a condition set field 608 and a command set field 610. The condition set field 608 contains one or more condition fields 612 (e.g., 1-n where n is any integer value) related to the corresponding conditional commands field 604. Such condition fields 612 may be included in any order. The command set field 610 contains one or more command fields 614 (e.g., 1-n where n is any integer value) related to the corresponding conditional commands field 604. Accordingly, when the condition field(s) 612 are met, the corresponding command field(s) 614 are scheduled for execution. Complex conditions and commands can be implemented by employing multiple conditions (e.g., conditions depending on conditions) and/or conunands (e.g., commands depending on commands) in the condition set field 608 and the command set field 610, respectively.

Condition field 612 includes a condition header 616, condition data 618, and optionally a condition parameter set 620. The condition header 616 may contain data indicating the presence of a following condition, a condition number/length, and/or a Boolean operation to be applied to the set of conditions (e.g., and versus or where and is applied by default). The condition data 618 contains data indicating which condition is contained in the condition field 612. Such conditions may include a comparison, such as less than, greater than, equal to, prefix of, etc. Such conditions may relate to a property of the data packet containing the conditional command block 600, a context of the data flow, a state of the network device processing the data packet, and/or other network node conditions. Some conditions may be checked without additional information. However, when additional information is desirable to provide context for the conditions in the condition data 618, a condition parameter set 620 is also included. The condition parameter set 620 relates to the condition in the corresponding condition data 618 and may be encoded as a TLV. The condition parameter set 620 may contain a parameter set header 622, which may contain data indicating the presence of a following set of parameters, a parameter set length, and/or related flags. The condition parameter set 620 may also contain a set of one or more parameter data fields 624 that contain data indicating the relevant parameter(s) related to the corresponding condition denoted by the condition data 618.

For example, the parameter data fields 624 may be set to include many items, such as a data value, reference to a piece of metadataldata carried in the packet and/or a packet header field, a reference to a piece of metadata related to the flow that is maintained in a state on a node outside the packet, a reference to a well-defined data item, such as an interface stats parameter, etc. Accordingly, the condition parameter data fields 624 may contain data indicating a value to support evaluation of the condition denoted by the condition data 618. Examples of conditions that may be represented by condition data 618 and condition parameter set 620 may include a comparison relative to a property of a header of a data packet (e.g., a value of TTL field, a value of a Differentiated Services Code Point (DSCP) field, a next hop prefix, etc.), a flow context (e.g., a presence of flow cache entry, a value of a data field in a corresponding flow cache entry such as a number of packets), a router state (e.g., a queue occupancy level), a utilization of an interface such as an ingress interface through which the packet entered the node or the presumed egress interface), upper-layer information (e.g., a three way handshake of TCP connections, a TCP keep alive), and/or node conditions (e.g., a node address in order to execute commands at a specific node).

On the other hand, a command field 614 includes a command header 626, command data 628, and optionally a command parameter set 630. The command header 626 may contain data indicating the presence of a following command, a command number/length, and/or a Boolean operation to be applied to the set of commands. The command data 628 contains data indicating which command is contained in the command field 614. Such commands may include ti commands that are complementary commands that are executed in addition to routing commands stored at the node. Such commands may also include override commands that are executed instead of the stored routing commands. The commands may indicate how the node should treat the data packet (e.g., drop, queue, buffer, prioritize), indicate the node should perform a custom function (e.g., classify), indicate the node should update packet contents (e.g., mark, add/update block parameter), indicate the node should update flow context (e.g., write data item), and/or indicate that the node should use specified next hop for the packet/flow. The commands in the command data 628 may also include primitives that act on the node.

For example, the commands may direct the node to allocate a resource (e.g., parameters include requested resource type, resource qualification/sizing, duration), act on packet header fields (e.g., swap header field with metadata item), and/or act on metadata carried in the packet (e.g., add a metadata item, replace a metadata item, increment a metadata value). Some commands may be checked without additional information. However, when additional information is desirable to provide context for the command in the command data 628, a command parameter set 630 is also included. The command parameter set 630 may be substantially similar to the condition parameter set 620 but may contain data indicating a value that defines a set of operation conditions for the command in the command data 628.

The global parameter set field 606 may be substantially similar to the condition parameter set 620 and/or the command parameter set 630. However, the global parameter set field 606 may contain data indicating a value that defines a set of operation conditions for the entire conditional command and/or all of the conditional commands in contained in the conditional commands field 604 and/or to support consuming information associated with the global parameter, such as storing data in a flow context.

For example, the conditional command block 600 can be employed to instruct the network node 208/210 processing the data packet 202 to modify a resource allocation for the data flow 212, modify a next hop for the data flow 212, and/or update a flow context for the data flow 212 upon occurrence of the condition. For example, a next hop may be chosen based on the destination address of the data packet 202 and based on the local routing table, which is programmed through various control plane protocols. The conditional command block 600 can be employed to modify such a chosen next hop. As another example, the conditional command block 600 can be employed to instruct the network node 208/210 processing the data packet 202 to modify data in the data packet 202, modify a next hop for the data packet 202, modify a priority for the data packet 202, drop the data packet 202, buffer the data packet 202, or modify metadata in the data packet 202 upon occurrence of the condition. As yet another example, the conditional command block 600 can be employed to instruct the network node 208/210 processing the data packet 20:2 to execute such commands upon determining that a condition is satisfied by parsing data from the data packet 202, checking a flow context of the data flow 212, checking a state of the network device, comparing data items, and/or checking an identity of the network device.

As noted above, it is also desirable to provide guidance to intermediate network nodes 10 regarding processing of the packets 202. In sample embodiments, Big Packet Protocol (BPP) is based on the idea of injecting meta-information into data packets 202 in order to provide guidance to intermediate network nodes 210 for how to process those data packets 202. This is done by attaching BPP Blocks with directives that provide guidance for how the data packet 202 should be processed or what resources must be allocated for a data flow 212, as well as metadata about the data packet 202 and the data flow 212 that the data packet 202 is a part of. Rather than relying on in-built logic of networking devices that may result in best-effort treatment of the data packet 202, a BPP networking device will act on those commands and metadata to handle the data packet 202, overriding any "regular" packet processing logic that is deployed on the device. Commands can be used, for example, to determine conditions as to when to drop a data packet 202, which queue to use, when to swap a label, to allocate a resource, or to measure a service level and compare it against a service level objective (SLO). Such a BPP packet is structured as depicted in FIG. 7.

FIG. 7 is a schematic diagram of an example Big Packet Protocol (BPP) header 700 that can be employed to implement a conditional command block, such as a conditional command block 600 used in a data packet header contained in a data packet 202 in a data flow 212. For example, BPP header 700 may be employed as a specific implementation of a conditional command block 600. It should be noted that the BPP header 700 fields are subject to change due to standardization, and the disclosed field structure is shown to illustrate the concepts included herein. As such, the BPP header 700 fields should not be considered limiting.

As illustrated in FIG. 7, a BPP packet 700 includes an Ethernet frame 702 and a BPP header 704 including pseudo-header 706 of the BPP packet 700's host protocol that may be integrated with different host protocols such as NSH, Geneve, etc, The pseudo-header 706 points to one or more BPP Blocks 708 of BPP header 704 as the next protocol. Other alternatives could be used to carry the same information in existing protocols. The BPP packet 700 may also include a variable-sized payload 710.

As further illustrated in FIG. 7, the BPP block 708 further includes a BPP block header 712, a command block 714, and a metadata block 716. In sample embodiments, the BPP block header 712 may be employed to implement a conditional command set that provides, inter cilia, integrated error handling support. For example, the BPP block header 712 may include a version field 718 that contains version information for the BPP block header 712, a length field 720 that indicates a total length (e.g., in bits) of the length of a block (e.g., 16, 32, 128 or more octets depending on the use case), and an error action field 722 that indicates actions to be taken in case of an error. Such actions may include an action to drop the packet, an action to ignore all conditional commands and revert to general processing, an action to ignore the fact that an error has occurred and attempt to continue performing all commands as if nothing has happened, etc.

The BPP block header 712 may also include a prior errors field 724 that may contain data indicating previous errors occurring at previous nodes along the path. The BPP block header 712 may also include an error verbosity field 726, a timing constraint field. 728, reserved bits (730), a metadata offset field 732 that indicates a number of bits between the BPP block header 712 and the beginning of metadata encodings, a checksum ield 734, and a pointer to the next header/BPP block 736.

As illustrated in FIG. 8, the BPP block header 602 also includes a BPP command 800 with a command header 802, a condition set 804, and an ti action set 806 that can be employed to implement conditional commands field 604, a condition header 616/command header 626, a condition set field 608, and a command set field 610, respectively. BPP block header 602 may also include one or more parameters that may implement parameter data fields 624.

As illustrated in FIG. 8, the conunand header 802 may contain a command length field 808 that indicates the length of the set of conditional commands and/or parameters in the BPP command 800. The command header 802 may also contain various flags containing other administrative data relevant to the BPP command 800. For example, a serial/concurrent flag 810 may be used to indicate whether the conditional command(s) in the BPP command 800 may be processed concurrently with other commands or must be processed serially.

The condition set 804 may contain a condition set length field 812 that indicates the length and/or number of conditions. The condition set 804 may also contain an or/and field 814 to indicate whether the conditions should all be satisfied to initiate the commands (and) or whether the commands should be initiated when any condition is satisfied (or), The condition set 804 also contains one or more conditions 816. The conditions 816 may include a length field 818 indicating the length of the condition in bits. The conditions 816 may also include a not field 820, which may indicate a default Boolean condition. The conditions 816 may also include various flags 822 to further clarify/modify the condition. For example, the flag 822 may provide dynamic extensibility by allowing for proprietary commands and functions and a deployment controlled by an operational framework. The conditions 816 may also include a condition type field 824 to indicate the condition to be employed. The conditions 816 may also include one or more parameters 826 to describe the conditions. The parameters 826 may include a parameter category field 828 a length field 830, and a value field 832 indicating the category of the parameter, the length of the parameter, and the value of the parameter, respectively, in TLV format. It should be noted that the condition set 804 structure disclosed herein is maintained in TLV format to allow use in conjunction with various metal a parameters under standardization by the Internet Engineering Task Force (IETF), such as Service Function Chaining (SFC) parameters, Network Service Header (NSH) parameters, IP Performance Measurement (IPPM) parameters, In-situ Operations, Administration, and Management (IOAM) parameters, etc.

The action set 806 may contain an action set length field 834 that indicates the length and/or number of commands. The action set 806 may also contain one or more actions 836 (e.g., commands) that may contain a length field 838 to indicate the length of the action 836. An action 836 may also contain various flags 840 to further clarify/modify the command. The action 836 may also contain an action type field 842 indicating the command. The action 836 may also include one or more parameters 844 to describe the commands.

In a sample embodiment, the flags 840 may include a serial flag 846 the defines whether an action or command may be executed serially or concurrently based on whether or not the command is dependent upon data from another command, for example. State extensions may provide non-blocking options including providing more data about the nature of the commands. Updates may occur after the packet is forwarded, and any errors may be indicated in a statelet.

Thus, the BPP Command 800 includes a command header 802 that includes the length of the command (selectable from several fixed-size choices) and a flag 846 to indicate if the command needs to be serialized or can be executed in parallel with its preceding command, if any. Actions in the BPP include a set of one or more BPP action primitives along with any parameters. As with conditions, to facilitate extensions, the type of action is indicated by a combination of two fields, A-type (Action Type) 842 and extension (X-) flag 840. Each action comes with a flag 846 that indicates whether it needs to be serialized within the command or whether it can be executed in parallel with the prior action.

Examples of conditional commands that may be concurrently processed include a conditional command that aims at updating a statelet/cache on the node. For example, a counter is incremented if the egress current queue length is greater than a certain value. A second conditional command may aim at making a forwarding decision. For example, if the packet length is less than a given value, use queue 1 (ELSE use queue 2). Such conditional commands may be processed concurrently.

On the other hand, an example of conditional commands that should be serialized include a conditional command that aims at deciding whether to ti drop the packet. For example, the packet is dropped if the hopcount is greater than a given value. If the second conditional command aims at updating a statelet/cache, for example, by incrementing the counter, the condition here is "true" even if the packet is dropped. Thus, the commands should be processed serially.

As an example of concurrent actions within a command, a conditional command may specify that if the hopcount is greater than a certain value, then: {action 1: increment drop counter in the statelet/cache; action 2: drop packet/forward to nil queue}.

As an example for segment routing using IPv6 and LOAM, concurrent processing is available when one conditional command aims at determining the next segment where the packet has to be sent, while the second conditional command aims at collecting specific OAM data from the node.

As an example for an overlay network, where both serialization and concurrency is required, for a Geneve header, NSH, and IOAM, one conditional command may atm at determining the overlay Virtual Network Identifier (VNI) ID from the Geneve header (with the Serial bit set), while the second conditional command may aim at applying specific services in the overlay network as specified in the NSH header for the VNI (for this command the Serial bit is not set). A third conditional command may further aim at collecting specific OAM data from the node for the VNI above (for this command the Serial bit is also set to zero). In this example, the second and third commands may be executed in parallel. Such an approach permits parallelization to be exploited where possible across data flows and within data packets by utilizing the capabilities of hardware (NPUs, GPUs, crypto accelerators and 3D memory, etc.) as possible to process the incoming packet sub-blocks concurrently.

In yet another example, BPP is used for per packet and per flow decisions. Often service providers need to apply certain Autonomous System (AS) based policies while also using netflow export for monitoring. However, netflow export and handling is typically treated separately based on cache expiration policies, but netflow export could be controlled and triggered by a command as well. In sample embodiments using the techniques described herein, these two commands are processed in parallel at the same time leading to two results in parallel.

FIG. 9 is a flowchart of an example method 900 for implementing conditional commands carried by data packets in a sample embodiment. For example, method 900 may be implemented by a network device acting as an edge node 208 or internal nodes 210 routing flows 212 and packets 202 (FIG. 2). Accordingly, method 900 may be employed, to execute conditional commands by reading data packet headers containing a conditional command block, such as conditional command block 600. In some cases, method 900 may also communicate via BPP and hence operate on a BPP block header 602. Further, in accordance with the features of the sub-blocks 500 described with respect to FIG. 5, headers 502 of the sub-blocks 500 may be checked to determine if the headers contain commands that may be processed in parallel rather than in series.

At block 902, a network node 208/210 may receive a data flow 212 with data packets 202 including conditional commands. At 904, the header 502 is checked, to determine whether the current sub-block of the data packet 202 has any interdependencies with another sub—block (i.e., the serial bit of header 502 is set). If so, the commands in the sub-block are processed serially at 906. On the other hand, if the serial bit of header 502 is not set, the commands in the sub-block are processed concurrently at 908 in either case, the network node 208/210 performs packet processing*, and may determine candidate actions, such as next hop queue updates, drop actions, etc. Such candidate actions include routing actions the network node 208/210 would otherwise take if no conditional command were present. Accordingly, such candidate actions may include packet handling actions that are to be applied unless conditional commands override such actions and lead to a different outcome.

At block 910, the network node 208/210 determines whether there are unprocessed conditional commands in the data packet 202. If not, the network node 208/210 may proceed to block 916. If there are unprocessed conditional commands in the data packet 202, the node proceeds to block 912. At block 912, the network node 208/210 obtains the conditions and associated command(s) from the conditional command and proceeds to block 914, At block 914, the network node 208/210 determines whether the condition(s) are satisfied. If the condition(s) are not satisfied, the network node 208/10 makes no changes to the candidate actions and returns to block 910 to check for additional unprocessed conditional commands. If the condition(s) are satisfied, the network node 208/210 proceeds to block 916.

At block 916, the network node 208/210 collects commands and overrides/supplements candidate actions as applicable. Accordingly, the network node 208/210 may determine that the condition(s) are satisfied at block 914. Based on the determination that the condition(s) are satisfied, the network node 208/210 may then execute the corresponding command(s) to alter handling of the data flow 212 or to alter handling of the data packet 202 at block 918.

If the conditions are not satisfied at block 914, the data packet 202 is handled based on the information in the packet header according to the candidate actions (e.g., according to general routing protocol).

Many conditional commands may be orthogonal in terms of what such commands affect (e.g., one updating flow context, another deciding packet priority, etc.). The head-end node and/or the endpoint node may select conditional commands to avoid conflicting commands that might result in undesired non-deterministic behavior.

Further, while method 900 depicts a basic processing flow that may be conducted on a network node 208/210 for any data packet 202 that arrives, various optimizations of this basic processing flow are possible, For example, such a processing flow may be optimized with regards to an order for executing commands. For example, complementary commands can be carried out immediately. Further, the sequence of execution of conditional commands can be reordered to maximize parallelization of command execution.

As a particular example, a data packet 202 might contain commands indicating how a data packet 202 should be handled when congestion is encountered at an egress interface, An application might decide that the data packet 202 is not really critical in such a case and could be dropped, In this case, the condition could be the level of utilization on the intended egress interface above a specified threshold. The corresponding action/command could then be to drop this data packet 202. A parameter could then contain the threshold level for the condition. This and many other functions can be created by employing conditional commands FIG. 10 is a schematic diagram of an example network device 1000 for serially or concurrently executing conditional commands obtained from ti network packets, such as data packets 202 as part of a data flow 212 in sample embodiments. For example, network device 1000 may implement an edge node 208 and/or an internal node 210 in a network domain 204. Further, the network device 1000 can be configured to implement method 900 as well as other methods/mechanisms disclosed herein. For example, the network device 1000 can transmit data packets 202 with a data packet header containing a conditional command block 600. Such headers can be implemented in a BPP header 712, Accordingly, the network device 1000 may be configured to implement or support the schemes/features/methods described herein, For instance, the features/methods in the disclosure may be implemented using hardware, firmware, and/or software installed to run on hardware. One skilled in the art will recognize that the term network device encompasses a broad range of devices of which network device 1000 is merely an example. Network device 1000 is included for purposes of clarity of discussion but is in no way meant to limit the application of the present disclosure to a particular network device embodiment or class of network device embodiments, The network device 1000 may be a device that communicates electrical and/or optical signals through a network, e.g., a switch, router, bridge, gateway, etc, As shown in FIG. 10, the network device 1000 may comprise transceivers (Tx/Rx) 1010, which may be transmitters, receivers, or combinations thereof. A Tx/Rx 1010 may be coupled to a plurality of downstream ports 1020 (e.g. downstream interfaces) for transmitting and/or receiving frames from other nodes and a Tx/Rx 1010 may be coupled to a plurality of upstream ports 1050 (e.g., upstream interfaces) for transmitting and/or receiving frames from other nodes, respectively. A processor 1030 may be coupled to the Tx/Rxs 1010 to process the data signals and/or determine which network nodes 208/210 to send data signals to. The processor 1030 may comprise one or more multi-core processors and/or memory devices 1040, which may function as data stores, buffers, etc. Processor 1030 may be implemented as a general processor or may be part of one or more Graphics Processing Units (GPUs), Network Processor Units (NPUs), application specific integrated circuits (ASICs), and/or digital signal processors (DSPs). The network device 1000 may comprise a self-driving packet module 1032, which may be configured to receive and process data packets 202 as described herein. The self-driving packet module 1032 can then obtain a conditional command from a data packet and determine whether a condition in the conditional command is satisfied based on packet header data, network device 1000 state, and/or based on associated parameters in the conditional command. Upon determining that the condition is satisfied, the self-driving packet module 1032 can execute the command from the conditional command, for example based on corresponding parameters stored in the conditional command. Such a command may cause the self-driving packet module 1032 to modify packet data, flow context, routing commands, network device 1000, and/or perform other actions to the data packet 202 and/or the corresponding data flow 212. In accordance with the techniques described herein, the data packet processing may be performed serially or in parallel based on the setting of the serial bit for each command as described.

The self-driving packet module 1032 may be implemented in a general-purpose processor, a field programmable gate array (FPGA), an ASIC (fixed/programmable), a network processor unit (NPU), a DSP, a microcontroller, etc. In alternative embodiments, the self-driving packet module 1032 may be implemented in processor 1030 as instructions stored in memory device 1040 (e.g., as a computer program product), which may be executed by processor 1030, and/or implemented in part in the processor 1030 and in part in the memory device 1040. The downstream ports 1020 and/or upstream ports 1050 may contain wireless, electrical and/or optical transmitting and/or receiving components, depending on the embodiment.

Although the example computing device is illustrated and described as a network node 208/210, the computing device may be in different forms in different embodiments. For example, the computing device may instead be a smartphone, a tablet, smartwatch, or other computing device including the same or similar elements as illustrated and described with regard to FIG. 10. Devices, such as smartphones, tablets, and smartwatches, are generally collectively, referred to as mobile devices or user equipment. Further, although the various data storage elements are illustrated as part of the network node 1000, the storage may also or alternatively include cloud-based storage accessible via a network, such as the Internet or server-based storage.

Memory 1040 may include volatile memory and/or non-volatile memory. Network node 1000 may include or have access to a computing environment that includes—a variety of computer-readable media, such as volatile memory and non-volatile memory, removable storage devices and non-removable storage devices. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

The network node 1000 may include or have access to a computing environment that includes an input interface, an output interface, and a communication interface. The output interface may include a display device, such as a touchscreen, that also may serve as an input device. The input interface may include one or more of a touchscreen, touchpad, mouse, keyboard, camera, one or more device-specific buttons, one or more sensors integrated within or coupled via wired or wireless data connections to the network node 1000, and other input devices. The network node 1000 may operate in a networked environment using a communication connection to connect to one or more remote computers, such as database servers. The remote computer may include a personal computer (PC), server, router, network PC, a peer device or other conunon DFD network switch, or the like. The communication connection may include a Local Area Network (LAN), a Wide Area Network (WAN), cellular, Wi-Fi, Bluetooth, or other networks.

Computer-readable instructions stored on a computer-readable medium are executable by the processor 1030 of the network node 1000, such as the self-driving packet module 1032. The self-driving packet module 1032 in some embodiments comprises software that, when executed by the processor 1030 performs network switch operations according to the serial and/or parallel processing of the conditional commands as described herein. A hard drive, CD-ROM, ROM, and RAM are some examples of articles including a non-transitory computer-readable medium such as a storage device. The terms computer-readable medium and storage device do not include carrier waves to the extent carrier waves are deemed too transitory. Storage can also include networked ti storage, such as a storage area network (SAN).

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A computer-implemented method for processing data packets in a network, comprising:
   receiving, at a receiver in a network device, a data flow including a data packet;
   identifying, with one or more processors, multiple sub-blocks from a self-describing block header of the received data packet, wherein a sub-block contains one or more commands to be executed;
   checking, with the one or more processors, at least one of (1) a serialization flag on a header of the sub-block to determine whether a command in the sub-block may be processed concurrently with another command in another sub-block and (2) a serialization flag in the command in the sub-block to determine whether the command and another command in the sub-block may be processed concurrently;
   in response to the checking indicating that the command in the sub-block may be processed concurrently with another command in the sub-block or another command in another sub-block, the one or more processors distributing the command and the another command to multiple processing resources for processing; and
   executing, with the one or more processors, the command and the another command in parallel via the multiple processing resources.

2. The method of claim 1, wherein the one or more commands comprise conditional commands having one or more command parameters, the command parameters containing data indicating a value that defines a set of operation conditions for the conditional command.

3. The method of claim 2, wherein a conditional command comprises a command and at least one condition that must be satisfied to execute the command.

4. The method of claim 3, wherein the conditional command instructs the processing resources to at least one of: modify a resource allocation for a data flow of data packets, modify a chosen next hop for the data flow of data packets, and update a flow context for the data flow of the data packets upon occurrence of the at least one condition.

5. The method of claim 3, wherein the conditional command instructs the processing resources to at least one of: modify data in the data packet, modify a chosen next hop for the data packet, modify a priority for the data packet, drop the data packet, buffer the data packet, and modify metadata in the data packet upon occurrence of the condition.

6. The method of claim 1, wherein the sub-block comprises metadata for processing by the one or more commands.

7. The method of claim 6, wherein the metadata comprises at least one global parameter having a value to support evaluation of all conditional commands in a header of the received data packet.

8. The method of claim 1, wherein the sub-block includes a command header followed by a condition and at least one set of actions.

9. The method of claim 1, wherein the sub-block includes at least one type, length, and value (TLV) parameter including at least one of a condition, metadata, a condition followed by a command, and a set of parameters particular to the sub-block.

10. The method of claim 9, wherein the TLV parameters include a set of shared parameters passed by the processing resources based on an indication in the sub-block header.

11. A device for processing data packets in a network, comprising:
    a receiver that receives data packets;
    a non-transitory memory comprising instructions; and
    one or more processors in communication with the memory, wherein the one or more processors execute the instructions to:
    receive, at the receiver, a data flow including a data packet;
    identify multiple sub-blocks from a self-describing block header of the received data packet, wherein a sub-block contains one or more commands to be executed;
    check at least one of (1) a serialization flag on a header of the sub-block to determine whether a command in the sub-block may be processed concurrently with another command in another sub-block and (2) a serialization flag in the command in the sub-block to determine whether the command and another command in the sub-block may be processed concurrently;
    in response to the check indicating that the command in the sub-block may be processed concurrently with another command in the sub-block or another command in another sub-block, distribute the command and the another command to multiple processing resources of the one or more processors for processing; and execute the command and the another command in parallel via the multiple processing resources.

12. The device of claim 11, wherein the one or more commands comprise conditional commands having one or more command parameters, the command parameters containing data indicating a value that defines a set of operation conditions for the conditional command.

13. The device of claim 12, wherein a conditional command comprises a command and at least one condition that must be satisfied to execute the command.

14. The device of claim 13, wherein the conditional command instructs the processing resources to at least one of: modify a resource allocation for a data flow of data packets, modify a chosen next hop for the data flow of data packets, and update a flow context for the data flow of the data packets upon occurrence of the at least one condition.

15. The device of claim 13, wherein the conditional command instructs the processing resources to at least one of: modify data in the data packet, modify a chosen next hop for the data packet, modify a priority for the data packet, drop the data packet, buffer the data packet, and modify metadata in the data packet upon occurrence of the condition.

16. The device of claim 11, wherein the sub-block comprises metadata for processing by the one or more commands.

17. The device of claim 16, wherein the metadata comprises at least one global parameter having a value to support evaluation of all conditional commands in a header of the received data packet.

18. The device of claim 11, wherein the sub-block includes at least one type, length, and value (TLV) parameter including at least one of a condition, metadata, a condition followed by a command, and a set of parameters particular to the sub-block.

19. The device of claim 18, wherein the TLV parameters include a set of shared parameters passed by the processing resources based on an indication in the sub-block header.

20. A non-transitory computer-readable media storing computer instructions for processing data packets in a network, that when executed by one or more processors, cause the one or more processors to:
- identify multiple sub-blocks from a self-describing block header of a data packet in a data flow received at a receiver of a network device, wherein a sub-block contains one or more commands to be executed;
- check at least one of (1) a serialization flag on a header of the sub-block to determine whether a command in the sub-block may be processed concurrently with another command in another sub-block and (2) a serialization flag in the command in the sub-block to determine whether the command and another command in the sub-block may be processed concurrently; and
- in response to the check indicating that the command in the sub-block may be processed concurrently with another command in the sub-block or another command in another sub-block, distribute the command and the another command to multiple processing resources of the one or more processors for processing in parallel.

* * * * *

UNITED STATES PATENT AND TRADEMARK OFFICE
CERTIFICATE OF CORRECTION

PATENT NO. : 11,533,263 B2
APPLICATION NO. : 16/651778
DATED : December 20, 2022
INVENTOR(S) : Li et al.

Page 1 of 1

It is certified that error appears in the above-identified patent and that said Letters Patent is hereby corrected as shown below:

On the Title Page

In item (57), in "Abstract", in Column 2, Line 4, delete "SPDB" and insert --SDPB-- therefor On page 2, in item (57), in "Abstract", in Column 1, Line 1, after "or", delete "h"

On page 2, in Column 1, under "Related U.S. Application Data", Line 2, delete "2017.", insert --2017, provisional application No. 62/565,221, filed on Sep. 29, 2017.--

Signed and Sealed this
Fourteenth Day of March, 2023

Katherine Kelly Vidal
*Director of the United States Patent and Trademark Office*